Sept. 17, 1963　　　　J. E. VANCE　　　　3,103,943
SPEED RESPONSIVE PNEUMATIC CONTROL
Filed Nov. 25, 1960
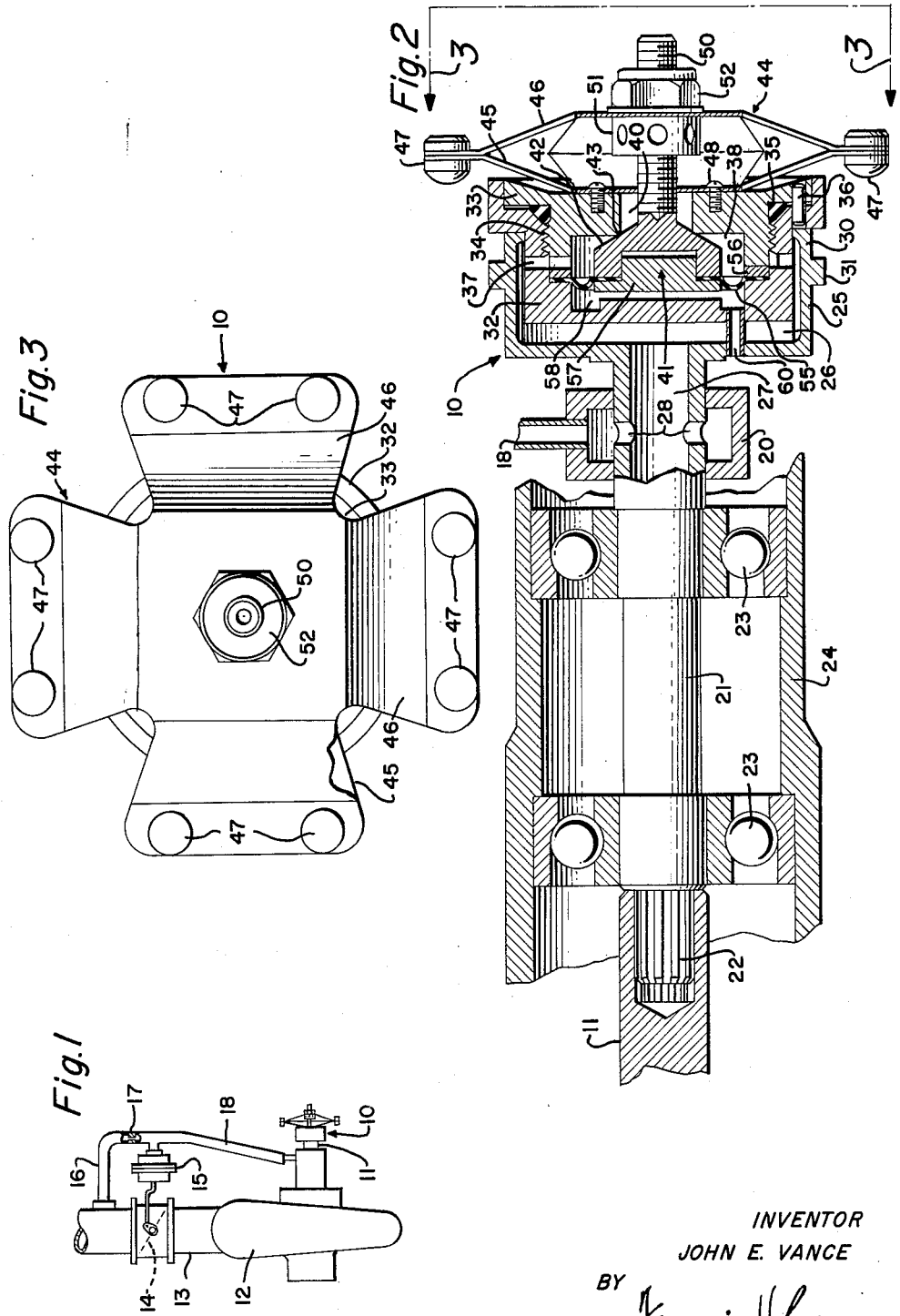
INVENTOR
JOHN E. VANCE
BY
*Francis H. Bebee*
ATTORNEY United States Patent Office 3,103,943
Patented Sept. 17, 1963

3,103,943
SPEED RESPONSIVE PNEUMATIC CONTROL
John E. Vance, Scottsdale, Ariz., assignor to The Garrett Corporation, Los Angeles, Calif., a corporation of California
Filed Nov. 25, 1960, Ser. No. 71,787
10 Claims. (Cl. 137—51)

This invention relates to governors or speed controlling mechanisms, and is more particularly directed to apparatus for pneumatically controlling the speed of operation of air motors, turbines and similar fluid pressure devices.

In the normal use of pneumatic governors with air motors or turbines operating at speeds ranging from 12,000 r.p.m. to 60,000 r.p.m., it is frequently desired to control such speed or produce a signal or pneumatic response at some precise turbine speed. One form of governor that has been used widely and found satisfactory for most such purposes is disclosed in Jackson Patent No. 2,858,839, dated November 4, 1958. While there are many features of the Jackson governor that are most effective, including the provision of a pressure diaphragm, the governor is not symmetrical with respect to its axis of rotation. Consequently, by the very nature of its arrangement and operation the balance of the governor changes during operation.

It is accordingly an object of the present invention to provide a pneumatic speed controlling mechanism which obviates the difficulties encountered in prior devices of this character.

Another object is to provide a pneumatic speed controlling mechanism which is completely symmetrical with respect to its axis of rotation and remains symmetrical at all speeds of operation.

A further object is to provide a symmetrical speed governor for high speed operation including a movable valve that is opened by a combination of centrifugal force and pneumatic pressure on a diaphragm or movable wall associated with said valve.

Still another object is to provide a symmetrical speed governor for use in a fluid pressure system and including a centrifugally operable valve for venting fluid to the atmosphere at a predetermined speed of operation, and a pressure sensitive diaphragm associated with said valve, said diaphragm being subject, on one side thereof, to pressure changes in the fluid pressure system and, on the other side thereof, to atmospheric pressure.

The above and other objects of the invention will be apparent from the following description and the accompanying drawing, in which:

FIG. 1 is a schematic view showing an air turbine provided with a speed responsive pneumatic governor embodying the principles of this invention;

FIG. 2 is an elevational view, partly in section, of the speed governor shown in FIG. 1; and FIG. 3 is a plan view on the plane of line 3—3 of FIG. 2.

Referring now to FIG. 1 of the drawing, a speed responsive pneumatic governor 10 is shown mounted on an extension 11 of the shaft of a pneumatic turbine 12. This turbine has an inlet 13 for conducting gas or other fluid under pressure from a suitable source of supply, such as another turbine or compressor (not shown) to the turbine wheel. Such fluid for driving the turbine is under the control of a valve 14 arranged for pivotal movement between open and closed positions in the inlet 13 in response to a suitable actuator, such as a conventional pneumatic actuator 15. Fluid pressure may be transmitted to the actuator through a conduit 16 having a restricted orifice 17 therein and connected to the inlet 13 at a point upstream of the valve 14. The construction of the actuator is such that, as long as pressure is applied thereto, the control valve 14 will be maintained in open position. However, by bleeding fluid at predetermined rates from the actuator 15, the valve 14 may be closed by the usual actuating rod to regulate the amount of fluid passing to the turbine 12 and hence regulate the speed thereof.

In accordance with the principles of this invention, speed responsive pneumatic governor 10 controls the rate of bleeding from the actuator 15. For this purpose, a fluid conduit 18 connects the pressure chamber of the actuator 15 with an annular inlet fitting 20 which surrounds and is in rotary sealed engagement with a shaft or supporting stem 21 of the speed governor 10. Supporting stem 21 is splined at 22 to the end of shaft 11 and is rotatably mounted in bearings 23 provided in a suitable support 24 attached to the turbine housing. As shown in FIG. 2, the governor 10, in addition to the supporting shaft 21, comprises a substantially cylindrical housing 25 having an inlet passage or chamber 26 therein. This inlet passage is in fluid communication with an axial passage 27 provided in the shaft 21, and said shaft has a plurality of radially spaced openings 28 therein so positioned as to be located within the annulus of the inlet fitting 20. Thus, fluid under pressure in the conduit 18 may pass through said openings 28 and passage 27 into the inlet chamber 26 of the governor housing 25.

Housing 25 comprises an outer cylindrical member 30 formed on or suitably fixed to the shaft 21 and provided with an annular flange or ring 31 which may subsequently be filed or cut away in portions around its circumference for balancing. An inner housing member 32 is non-rotatably fitted into the outer cylinder 30 and spaced from the inner wall thereof to form the inlet chamber 26. Finally, a valve seat carrying member 33 is threaded at 34 into the inner member 32, made fluid tight with a packing 35, and fixed against rotation and in proper position relative to the housing 25 by a pin 36. Registering passages 37 are provided in the inner housing 32 and valve seat member 33 so as to connect the inlet 26 with a valve chamber 38; and a vent passage or orifice 40 may open said valve chamber to the atmosphere.

Fluid under pressure entering the governor housing 25 through inlet 26 will normally be held therein by a movable valve member 41. This movable member is provided with a sloping valve surface 42 for engagement with a valve seat 43 which comprises the edge where the valve chamber 38 opens into the vent passage 40. Resilient but fluid tight contact of valve surface 42 with seat 43 is effected by a resilient spring flyweight device 44. Said flyweight device 44 may be of any suitable symmetrical construction and, in the form shown in FIGS. 2 and 3, comprises an inner, cross-shaped angular, resilient member 45 and a correspondingly shaped, outer angular, resilient member 46. The extremities of the angular, resilient members are held together by any desired or required number of suitably weighted rivets 47 which constitute flyweights, and the inner member 45 is attached to the housing 25 for rotation therewith by screws 48 passing through said member 45 into the valve seat carrying member 33.

As indicated in FIG. 2, the movable valve carrying member 41 has an outwardly extending threaded shaft or screw 50 formed thereon and passing through suitable openings provided in the resilient members 45 and 46. A positioning nut 51 is threaded on the shaft 50 between said resilient members 45 and 46 in contact with the latter, and a lock nut 52 holds the parts in any adjusted position on the threaded shaft. It will be apparent that flexing of the resilient members 45 and 46 by adjustment of outer spring 46 determines the force with which the valve 42 is held against the seat, and that such force may be adjusted by moving the nuts 51 and 52 along the screw 50. Also, it will be understood that the flyweights 47 and the angular resilient members 45 and 46 constitute a centrifugally responsive device for moving the valve carrying member 41, and that the spring loading of such device may be varied or adjusted by the nuts 50 and 51.

As thus far described, the speed responsive pneumatic governor 10 would function solely in response to the speed of rotation of the centrifugally responsive flyweight device 44. In order to facilitate such response and also to make the operation of the device subject to changes in pressure and/or in altitude, a pressure responsive movable wall or diaphragm 55 is provided in the valve chamber 38. This diaphragm interconnects the valve member 41 with the housing 25 and is held in operative position by a retaining ring 56 between the threaded valve seat carrying member 33 and the inner housing member 32, and said diaphragm is attached to the inner end of the movable valve carrying member 41 by a suitable retaining plug 57. In this way, the diaphragm forms a vent chamber 58 on one side thereof, which chamber may be vented to the atmosphere through a passage 60. Thus, changes in atmospheric pressure will affect the pressure differential acting on the diaphragm.

In operation, with the turbine shaft 11 turning at normal speed, the shaft 21 of the pneumatic speed governor 10 and, in fact, the entire governor assembly just described, will rotate therewith at the same speed. Fluid under pressure to effect rotation of the wheel and shaft of the turbine 12 is supplied through the inlet 13 and will pass through the conduit 16 and restricted orifice 17 to the valve actuator 15. Such pressure will move the diaphragm of actuator 15 and actuating rod to open valve 14 for normal operation of the turbine. In the event that pressure in the inlet 13 increases, the increase will cause a corresponding increase in the speed of rotation of the turbine shaft 11 and pneumatic speed governor 10. At some predetermined speed, centrifugal force acting on the flyweights 47 and the increased pressure acting on the exposed surface of the valve and the diaphragm 55 will cause the valve member 41 to move and release the pressure. This will affect the actuator 15 and cause the valve 14 to move in a closing direction thereby reducing the speed of the turbine.

During the phase of increased speed of rotation of the speed governor 10 and increased pressure to the actuator 15, such increased pressure will be transmitted to the speed governor 10 through conduit 18, inlet device 20, passage 27, and inlet passage 26. From the inlet 26, fluid under such increased pressure passes into the valve chamber 38. Here, as mentioned above, the pressure will exert its force in a valve opening direction on the exposed sloping valve surface 42 and on the diaphragm 55. Simultaneously, the increased speed of rotation of the flyweight device 44 will cause the flyweights 47 to move slightly outwardly flexing the angular resilient members 45 and 46, thereby moving the screw or shaft 50 and its associated valve carrying member in a valve opening direction. Thus, the valve surface 42 on the movable valve member will be separated from valve seat 43 on the housing and the fluid under pressure will bleed or be vented to the atmosphere through the passage 40. Due to the provision of the restriction 17 in the conduit 16, any such reduction in pressure in the valve chamber 38 will be reflected in a reduction in pressure in the actuator 15 with a corresponding closing movement of the valve 14.

From FIGS. 2 and 3, it will be apparent that the construction of the speed governor 10 is symmetrical in every respect; moreover, the symmetry is not changed when the device is centrifugally actuated, as is the case in some prior constructions. This is an important consideration when precise operation is required at the high speeds of rotation which are normal in turbine operation. In addition, the device is extremely sensitive due to the combination of centrifugal force and diaphragm pressure acting on the movable valve member 41.

I claim:
1. A speed responsive governor comprising: a cylindrical housing which is adapted for balanced rotation on its longitudinal axis, said housing having a fluid inlet passage, a valve chamber communicating therewith, and a vent passage; a member movable in said valve chamber in response to centrifugal force; a valve communicating with said chamber and said vent passage and having a pair of valve elements adapted to alternate between open and closed positions, one of said elements being carried by said member and the other by said housing; and a movable wall interconnecting said valve carrying member and said housing and responsive to the fluid pressure in said valve chamber, all of the parts being substantially symmetrically arranged with respect to said longitudinal axis so as to provide such balanced rotation about said axis.

2. A speed responsive governor comprising: a housing which is adapted for balanced rotation on its longitudinal axis, said housing having a fluid inlet passage, a valve chamber communicating therewith, and a vent passage; a member movable in said valve chamber in response to centrifugal force; a valve communicating with said chamber and said vent passage and having a pair of valve elements adapted to alternate between open and closed positions, one of said elements being carried by said movable member and the other by said housing; and a movable wall interconnecting said valve carrying member and said housing and dividing said valve chamber to provide a second chamber at the opposite side of the wall from said valve carrying member, said second chamber communicating with the atmosphere, said wall being responsive to a fluid pressure differential between said two chambers, all of the parts being substantially symmetrically arranged with respect to said longitudinal axis so as to provide such balanced rotation about said axis.

3. A speed control device comprising: a symmetrical housing which is adapted to be rotated on its longitudinal axis, said housing having an inlet passage and a vent; a movable valve member disposed in said housing between said inlet and said vent; resilient means associated with said movable valve member for holding said valve normally closed but responsive to centrifugal force to open said valve at a predetermined speed of rotation of said symmetrical housing; and a diaphragm interconnecting said valve member and said housing, said diaphragm being exposed on one side thereof to the pressure in said inlet and on the other side thereof being vented to the atmosphere, all of the parts being substantially symmetrically arranged with respect to said longitudinal axis so as to provide balanced rotation about said axis.

4. A speed responsive device comprising: a cylindrical housing which is adapted for balanced rotation on its longitudinal axis, said housing having an inlet passage symmetrically arranged therein and an axial vent passage; a movable valve member disposed in said vent passage; and means for moving said movable valve member in response to the speed of said shaft, said last-mentioned means including a symmetrical flyweight device and a pressure responsive movable wall operatively connected to said movable valve member, all of the parts being substantially symmetrically arranged with respect to said longitudinal axis so as to provide such balanced rotation about said axis.

5. A speed responsive governor comprising: a cylindrical housing which is adapted to be rotated by a shaft the speed of which is to be governed, said housing having an inlet passage symmetrically arranged therein and an axial vent passage; an axially movable valve member disposed in said vent passage so as to regulate the fluid flow from the inlet passage through said vent passage; symmetrically arranged means connected with said valve member and housing and responsive to a differential between inlet and ambient pressures to tend to open said valve; and symmetrical flyweight means arranged outside said housing and operatively connected to said movable valve member so as to move it in a valve opening direction in response to centrifugal force.

6. A speed responsive governor comprising: a cylindrical housing which is adapted to be rotated by a shaft the speed of which is to be governed, said housing having an inlet passage symmetrically arranged therein and an axial vent passage; an axially movable valve member disposed in said vent passage so as to regulate the fluid flow from the inlet passage through said vent passage; symmetrical flyweight means arranged outside said housing and operatively connected to said movable valve member so as to move it in a valve opening direction in response to centrifugal force; and a diaphragm operatively interconnecting said movable valve member and said housing thereby providing a seal between said movable valve and said housing.

7. A speed responsive control device comprising: a cylindrical housing which is adapted for balanced rotation on its longitudinal axis, said housing having an inlet passage symmetrically arranged therein, a symmetrical valve chamber in fluid communication with said inlet passage, and an axially aligned vent passage between said valve chamber and the atmosphere; a movable valve member axially disposed in said valve chamber and normally closing said vent passage; means for moving said movable valve member in response to the speed of rotation of said housing; and a diaphragm arranged in said valve chamber operatively interconnecting said movable valve member and said housing, one side of said diaphragm being exposed to the pressure in said valve chamber and the other side thereof being vented to the atmosphere whereby said diaphragm may supplement the action of said last-mentioned means.

8. A speed responsive governor comprising: a cylindrical housing which is adapted to be rotated by a shaft the speed of which is to be governed, said housing having an inlet passage symmetrically arranged therein, a symmetrical valve chamber in fluid communication with said inlet passage, and an axially aligned vent passage between said valve chamber and the atmosphere; a movable valve member axially disposed in said valve chamber and normally closing said vent passage; resilient flyweight means arranged outside said housing and operatively connected to said movable valve member so as to resiliently hold said valve member in closed position but open it in response to centrifugal force; and a diaphragm arranged in said valve chamber operatively interconnecting said movable valve member and said housing, one side of said diaphragm being exposed to the pressure in said valve chamber and the other side thereof being vented to the atmosphere, the construction and arrangement being such that said diaphragm may supplement the action of said flyweight means.

9. A speed responsive governor, comprising: a rotatable shaft; a cylindrical housing carried by said shaft, the axes of said housing and shaft being in alignment, said housing forming a chamber with a fluid pressure inlet and an axially disposed outlet leading to a region of reduced pressure; a valve seat at the juncture of said outlet and said chamber; a movable wall extending transversely of said chamber and dividing the same into control pressure and atmospheric pressure sections, the inlet and outlet communicating with the control pressure section; a valve element on said movable wall for engagement with and disengagement from said seat upon predetermined movement of said wall, fluid pressure in the control pressure section of said chamber tending to move said wall away from said seat; and means for resiliently urging said valve element toward said seat in opposition to the fluid pressure when said shaft is rotating below a predetermined speed and away from said seat when said shaft exceeds said predetermined speed, said means having a pair of oppositely bowed resilient elements extending transversely of the axis of said housing and secured together and weighted at their outer abutting ends, one of said resilient elements being secured to said housing and the other being connected to said valve in a manner to cause the resiliency of said elements to urge said valve toward said seat.

10. A speed responsive governor, comprising: a rotatable shaft; a cylindrical housing carried by said shaft, the axes of said housing and shaft being in alignment, said housing forming a chamber with a fluid pressure inlet and an axially disposed outlet leading to a region of reduced pressure; a valve seat at the juncture of said outlet and said chamber; a movable wall extending transversely of said chamber and dividing the same into control pressure and atmospheric pressure sections, the inlet and outlet communicating with the control pressure section; a valve element on said movable wall for engagement with and disengagement from said seat upon predetermined movement of said wall, fluid pressure in the control pressure section of said chamber tending to move said wall away from said seat; centrifugally responsive means for moving said valve away from said seat when said shaft exceeds a predetermined speed of rotation, said centrifugally responsive means having a first resilient member secured adjacent its center to said housing and extending transversely of the axis thereof, the outer ends of said member being bowed away from said housing; a second similarly shaped oppositely arranged resilient member engaged at its outer ends with the outer ends of said first member and connected at the center with said valve; and flyweight means carried by the engaged ends of said members, said members and said flyweight means being symmetrical about the axis of rotation of said shaft and housing.

References Cited in the file of this patent

UNITED STATES PATENTS

| 1,205,127 | Herr _____ | Nov. 14, 1916 |
| 1,985,770 | Edwards _____ | Dec. 25, 1934 |
| 2,686,533 | Gratzmuller _____ | Aug. 17, 1954 |
| 2,858,839 | Jackson _____ | Nov. 4, 1958 |

FOREIGN PATENTS

| 692,849 | France _____ | Aug. 11, 1930 |
| 1,061,624 | Germany _____ | July 16, 1959 |